VISUAL CHARACTER INSPECTION SYSTEM

Filed Dec. 29, 1960 2 Sheets-Sheet 1

*INVENTOR*
EVON C. GREANIAS
*BY* Paul M. Brannen
*AGENT*

United States Patent Office 3,156,894

Patented Nov. 10, 1964

3,156,894

VISUAL CHARACTER INSPECTION SYSTEM

Evon C. Greanias, Chappaqua, N.Y., assignor to International Business Machines Corporation, New York, N.Y., a corporation of New York Filed Dec. 29, 1960, Ser. No. 79,388

12 Claims. (Cl. 340—146.3)

This invention relates to visual character inspection systems and particularly to a visual character inspection system for use with an automatic character recognition system.

In the automatic reading of page documents, it is sometimes desirable to provide means for manual transcription of a poorly legible character, which although legible to a human is sufficiently deteriorated to be unrecognizable by the automatic character recognition system. The automatic character recognition system will, of course, provide an indication that it has encountered a character which it cannot recognize. In such cases, it would be highly desirable for a human operator to examine the questionable character and to manually transcribe the character into the system output, without removing the document from the machine and rereading the document. In a particular type of character recognition system to which the present invention is particularly well adapted, the documents to be read are fed, one at a time into a rotating drum which presents the document, line-by-line to a scanning station where the characters are scanned, one by one long each line. That is, the document is read character-by-character and line-by-line. The character recognition system includes circuits which detect uncertainties or rejects in the reading of characters, and provides output signals which indicate that although a character has been scanned, its identity has not been established with certainty.

In practical systems, the operating speed, including the drum rotational speed, is so great that the operator cannot read the moving document to identify the rejected character, and much time would be wasted if the drum were stopped or slowed sufficiently to permit such reading.

Accordingly, an object of the present invention is to provide a visual character inspection system for a page reading character recognition system.

Another object of this invention is to provide a visual character inspection system for inspecting characters in a character recognition system without slowing or stopping the document transporting system.

A further object of the invention is to provide a visual character inspection system for inspecting characters in a character recognition system and thereafter manually keying in the information conveyed by the defective character.

Still another object of the invention is to provide a visual character inspection system for a character recognition system in which the document transport is capable of continuously recurrently presenting a character to be examined to a visual inspection station.

Briefly described, the present invention provides means governed by a reject signal in a character recognition system for recurrently presenting the rejected character at a visual inspection station, and by an appropriately timed signal, illuminating the rejected character by a flash or strobe lamp, so that a stroboscopic effect is produced, permitting an operator to visually inspect the character. Thereafter, if the operator is able to identify the character, he can manually insert the character information, via a conventional keyboard, into the system utilizing the character recognition data.

In a preferred embodiment, the documents are automatically loaded, one after the other, on a document drum capable of rotational and axial movement, so that the entire document can be scanned character-by-character and line-by-line, by relative motion between the drum and a scanning station. At one end of the document reading drum, a magnetizable surface is provided around the periphery, and magnetic reading and writing heads are disposed to write and read signals on the drum surface. When a reject of a character by the character recognition system occurs, a signal is recorded on the drum. At the same time the axial or line-by-line motion of the drum is stopped so that the line containing the questionable character is recurrently presented to an optical viewing station, provided with a suitable optical system to enable an operator to view an enlarged image of the characters. In order to effectively arrest the motion of the drum to permit the questionable character to be visually examined, a high-speed flash lamp, or strobe lamp, located at the optical viewing station is governed by the recorded reject signal so that the lamp flashes each time the questionable character passes the viewing station. Because of the phenomenon of persistence of vision, the character will appear stationary and can be inspected by the operator, just as in any stroboscopic viewing operation of high-speed motion.

Assuming that the operator is able to identify the questionable character, as will be the case in the majority of instances, he then operates a keyboard to insert the character identity into the system, after which resetting circuits restore all functions to their normal running condition.

The foregoing and other objects, features and advantages of the invention will be apparent from the following more particular description of a preferred embodiment of the invention, as illustrated in the accompanying drawings.

In the drawings.

Similar reference characters refer to similar parts in each of the figures of the drawings.

Figure 1:
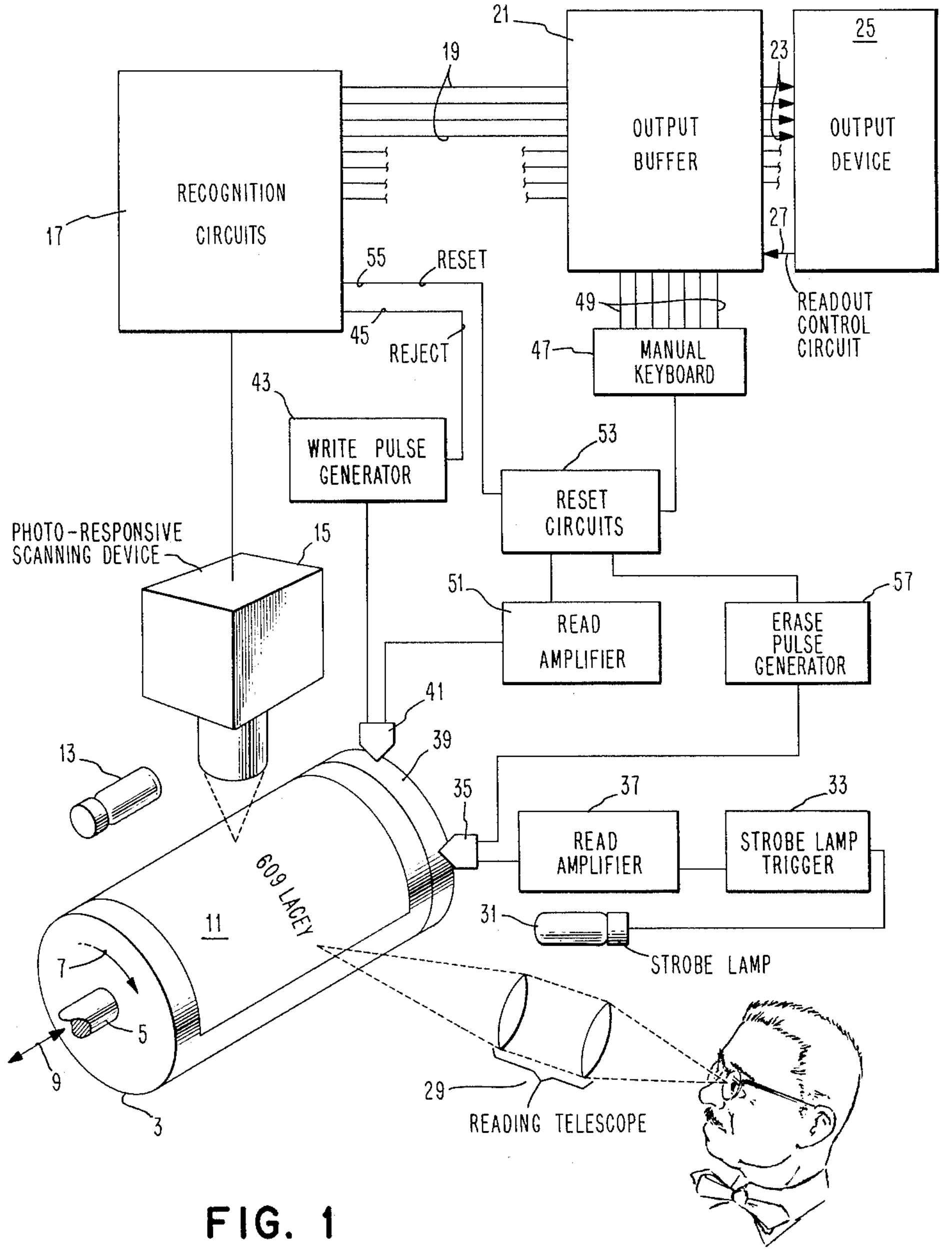
FIG. 1 is a diagrammatic illustration of a preferred embodiment of the invention, as applied to an optical character recognition system.

Referring to FIG. 1, the present invention is shown as it would be applied to a page document character recognition system of the optical type. Documents to be read are automatically placed on and later removed from a reading drum 3, mounted on a shaft 5 for rotation in the direction shown by arrow 7 and axial movement as shown by arrow 9. The apparatus for placing and removing documents such as 11 on drum 3 is not shown, since it forms no part of the invention. Suffice it to say that the document 11, held on drum 3 by suitable means such as a vacuum within the drum, is moved past a character sensing station comprising a source of illumination 13 and a photo-responsive scanning device 15, so that the characters on each document are scanned, serially by character and line-by-line, by advancing the drum axially one line space for each rotation.

The scanning information is supplied to suitable recognition circuits 17, which provide selective outputs on a selected one of a plurality of character recognition output lines 19, designating the character scanned. Details of the character recognition system are not shown, since it may take any one of a number of well known forms and its actual construction is not germane to this invention. As is customary in systems of this type, a reject circuit is provided, which is activated any time that the system is unable to positively identify a character without ambiguity. One such system is disclosed for example in U.S. Patent 2,663,758, issued December 22, 1953, to D. H. Shepard. The system disclosed therein includes an error indicator circuit 60 which is energized when an "impossible" character is "recognized."

An output buffer, or temporary storage 21 is connected with the character recognition system, for assembling and holding character information for subsequent delivery over output lines 23 to a utilization or output device 25, such as a magnetic tape recording device, a record card punch, a computer, or other device which is to utilize the information derived from scanning the documents. As is the usual case, the output device governs the readout of collected information in the output buffer by providing a signal on a readout control circuit 27, which notifies the buffer 21 that the output device 25 is ready to accept information.

To this point, there has been described a conventional page reading character recognition system, and an associated output buffer and output device, all elements of which may be found in the prior art.

Considering now the portion of the system comprising a preferred embodiment of the invention, an optical inspection station is provided including a reading telescope indicated schematically at 29 and a strobe lamp 31. The reading telescope is adjusted to read a character on the document 11 a predetermined distance from the point of focus of the photo-responsive scanning device 15, say for example, a 90° arc later in the travel of the character. Since the drum rotates at a relatively high speed, the characters must be effectively "stopped" by stroboscopic action in order to be observed. Therefore, means must be provided for recurrently flashing the strobe lamp 31, so that the same character is recurrently and strongly illuminated as it passes the reading telescope.

The strobe lamp 31 is energized from a strobe lamp trigger 33, such devices being arranged to energize the lamp to provide an extremely brilliant flash of extremely short duration each and every time a pulse is supplied to the input of trigger 33. In turn, the pulses which trigger strobe lamp trigger 33 are supplied by a read winding of a read-write magnetic head 35, amplified to a suitable value by an amplifier 37. The pulses read by the head 35 are on a magnetic track or surface 39, which may be merely a magnetizable surface on one end of the document drum 3, or may be a separate drum or disc synchronized in rotation with drum 3.

The pulses on track 39 which govern the flashing of lamp 31 are recorded on the track by current supplied to a write or record winding of a magnetic head 41 from a write pulse generator 43 which in turn is governed by a reject signal from the character recognition circuits 17 via a REJECT line 45.

It is apparent from the foregoing that when the character recognition circuits reject a character, a pulse is recorded on track 39, which later causes strobe lamp 31 to flash as the rejected character passes the optical inspection station. The character is briefly illuminated each time the drum revolves and the signal pulse is read by the magnetic head 35, and by persistence of vision, will appear stationary and well illuminated to an observer using the reading telescope.

Having thus been provided with an opportunity to examine the rejected character, the operator is provided with means for manually inserting the character value into the output buffer, for later delivery to the output device.

At the time the character reject signal was generated, the outputs 19 to the buffer are inhibited, and a corresponding set of lines 49 from a manual keyboard are enabled, by operation of suitable switches or gates. Then, when the operator has decided what the rejected character actually is, he operates the corresponding key on the keyboard, and the character enters the output buffer where the character properly belongs.

Following inspection of the rejected character and manual insertion of the correct value, a resetting operation takes place which restores the equipment to its normal running condition. Operation of a reset key, on the keyboard, for example, causes the magnetic pulse to be read from track 39 by the read winding of magnetic head 41, which after amplification by read amplifier 51, is used to govern the actuation of certain of the reset circuits 53.

Reset line 55 has a signal applied thereto, restoring the operation of the character recognition equipment, thereby permitting the feeding of characters to output buffer 21 to resume. Also, a signal is supplied, after a suitable time delay, to erase pulse generator 57, which then sends current through a winding of magnetic head 35 which erases the reject signal on track 39. The equipment is thus restored to its initial scanning condition.

From the foregoing, it is apparent that the present invention renders it possible for a human operator to examine a character which has been rejected by a character recognition system, and to insert the character value manually into the system if it is humanly readable. This is accomplished by creating a reject signal which at the proper time causes the rejected character to be brightly illuminated as it passes an optical inspection station. The document line feeding action is arrested, with the result that the rejected character is recurrently presented and illuminated at the inspection station, to thereby enable a human operator to inspect the character and determine its actual value. Means including a manually operated keyboard is provided to permit the value of the rejected character to be entered into the system. Thereafter, suitable resetting means are provided for restoring the entire system to its initial condition. Obviously, the ouput buffer and the keyboard may actually constitute an input buffer and console keyboard of a computer.

Figure 2:
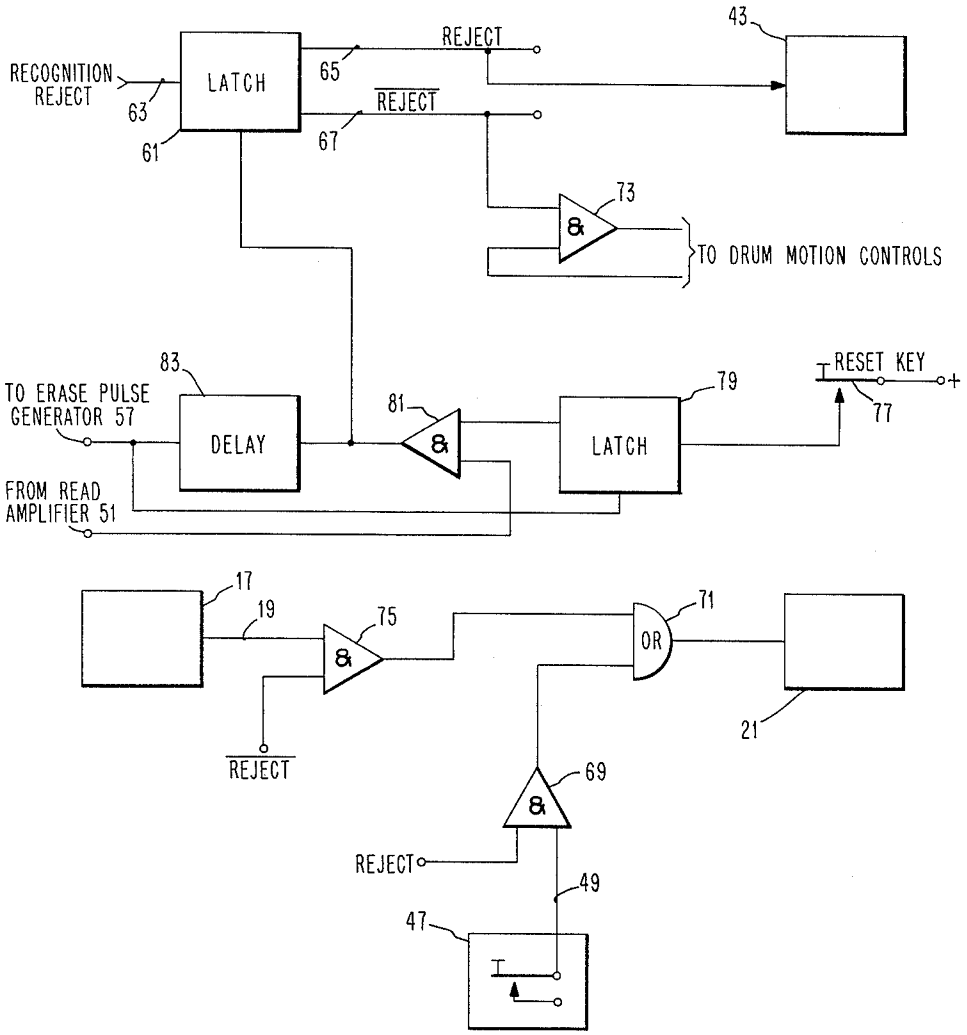
FIG. 2 is a diagrammatic illustration of certain of the detailed circuits which may be employed in the arrangement shown in FIG. 1.

For the purposes of further teaching the practice of the invention, a few of the circuit arrangements which may be employed therein are illustrated in FIG. 2. It must be understood that this circuitry is exemplary only, since many variations will suggest themselves to those skilled in the art.

Referring now to FIG. 2, the first circuit described is that which is activated by a reject condition and remains activated until reset at the end of the inspection and correction operation. The circuit includes a bistable unit, such as a conventional electronic latch 61, for example, which is provided with an input on a RECOGNITION REJECT line 63 as a result of the character recognition system rejecting a character. The resultant setting of latch 61 results in a signal output on REJECT line 65, and removal of the signal on the negative or $\overline{\text{REJECT}}$ line 67. The REJECT signal is supplied to write pulse generator 43 as previously described, and is also supplied to an AND circuit such as 69, one of which is provided in each line from keyboard 47. The output from AND circuit 69 is supplied to buffer 21 via an OR circuit 71.

When the $\overline{\text{REJECT}}$ signal line goes down, it disables AND circuit 73, which is in the drum motion control circuits, so that no further axial motion of drum 3 takes place. Also, removal of this signal disables AND circuit 75, so that no further signals are supplied from the character recognition circuits 17 to buffer 21. It is understood, of course, that the switching circuit illustrated in this case is repeated for however many output lines 19 and 49 exist.

The resetting circuit includes a reset key 77, which sets a reset latch 79. When set, the output from this latch, switched with the output of read amplifier 51 and an AND circuit 81, provides a reset signal to latch 61. Also after a delay imposed by the delay device 83, a signal is supplied to reset latch 79, and to erase pulse generator 57, which then supplies a suitable pulse to magnetic head 35, appropriately timed to erase the recorded reject signal. The apparatus is at this time restored to its normal scanning condition.

From all of the foregoing, it is apparent that the present invention provides apparatus for visually inspecting characters which have been rejected by an automatic character recognition system, and for entering the value of such characters into the system manually, if they are humanly legible, all without the necessity of removing the document from the machine, or slowing down or stopping the drum which bears the document containing the questionable character.

Other modifications will readily suggest themselves to those skilled in the art. For example, the scanner may be of the well known flying spot type, and the scanning image arrested by maintaining the deflection energy at the values required to hold the scanning beam on the questionable character. In such a system, it would be desirable to protect the photosensitive device, such as a photomultiplier tube cathode against the deleterious effects of the strobe lamp flash. This could be accomplished, for example, by switching off the high voltage supply to the photomultiplier by the same pulse used to trigger the strobe lamp.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a character recognition system including means for selectively recurrently presenting a document to a scanning station, scanning means at the scanning station for scanning characters, recognition circuit means connected to said scanning means for providing outputs indicative of the characters scanned, said recognition circuit means having reject signal means operable to provide a signal upon the scanning of a questionable character, the combination with the foregoing of visual character inspection means governed by said reject signal means, including a recurrently operated strobe lamp for recurrently illuminating the questionable character to effectively stop the motion of the document for visual inspection.

2. In a character recognition system including means for selectively recurrently presenting a document to a scanning station, scanning means at the scanning station for scanning characters, recognition circuit means connected to said scanning means for providing outputs indicative of the characters scanned, buffer storage means connected to said recognition circuit means for storing the outputs of said character recognition circuit means for subsequent delivery to an output device, said recognition circuit means having reject signal means operable to provide a signal upon the scanning of a questionable character, the combination with the foregoing of visual character inspection means governed by said reject signal means, including switching means to stop delivery of the output of said recognition circuit means to said buffer storage means, and means including a recurrently operated strobe lamp for recurrently illuminating the questionable character to effectively stop the motion of the document for visual inspection.

3. In a character recognition system including means for selectively recurrently presenting a document to a scanning station, scanning means at the scanning station for scanning characters, recognition circuit means connected to said scanning means for providing outputs indicative of the characters scanned, buffer storage means connected to said recognition circuit means for storing the outputs of said character recognition circuit means for subsequent delivery to an output device, said recognition circuit means having reject signal means operable to provide a signal upon the scanning of a questionable character, the combination with the foregoing of a visual character inspection means governed by said reject signal means including switching means to stop delivery of the output of said recognition circuit means to said buffer storage means, means including a recurrently operated strobe lamp for recurrently illuminating the questionable character to effectively stop the motion of the document for visual inspection, a manually operated character keyboard, and means governed by said switching means to supply outputs indicative of keyboard-selected characters to said buffer storage means.

4. In a character recognition system including means for selectively recurrently presenting a domument to a scanning station, scanning means at the scanning station for scanning characters, recognition circuit means connected to said scanning means for providing outputs indicative of the characters scanned, buffer storage means connected to said recognition circuit means for storing the outputs of said character recognition circuit means for subsequent delivery to an output device, said recognition circuit means having reject signal means operable to provide a signal upon the scanning of a questionable character, the combination with the foregoing of a visual character inspection means governed by said reject signal means including switching means to stop delivery of the output of said recognition circuit means to said buffer storage means, means including a recurrently operated strobe lamp for recurrently illuminating the questionable character to effectively stop the motion of the document for visual inspection, a manually operated character keyboard, means governed by said switching means to supply outputs indicative of keyboard-selected characters to said buffer storage means, and reset means effective to restore said switching means to the condition for delivering outputs from said recognition circuit means to said buffer storage means.

5. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of characters scanned, said recognition circuit means having reject signal means operable to provide a signal upon the scanning of a questionable character, the combination with the foregoing of visual character inspection means governed by said reject signal means including means for halting the axial motion of the document drum, and a recurrently operated strobe lamp for recurrently illuminating the questionable character to effectively stop the rotation of the drum so that the questionable character may be visually examined.

6. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of the characters scanned, buffer storage means connected to said recognition circuit means for storing the outputs of said character recognition means for subsequent delivery to an output device, said character recognition circuit means including reject signal means operable to provide a signal upon the scanning of a questionable character, the combination with the foregoing of visual character inspection means governed by said reject signal means, including means for halting the axial movement of said drum, switching means to stop delivery of the output of said recognition circuit means to said buffer storage means, and means including a recurrently operated strobe lamp for recurrently illuminating the questionable character to effectively stop the rotation of the drum so that the questionable character may be visually examined.

7. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing output indicative of the characters scanned, buffer storage means connected to said recognition circuit means for storing the outputs of said character recognition means for subsequent delivery to an output device, said character recognition circuit means having reject signal means operable to provide a signal upon the scanning of a questionable character, the combination with the foregoing of visual character inspection means governed by said reject signal means, including means for halting the axial movement of said drum, switching means to stop delivery of the output of said recognition circuit means to said buffer storage means, means including a recurrently operated strobe lamp for recurrently illuminating the questionable character to effectively stop the motion of the document for visual inspection, a manually operated character keyboard, and means governed by said switching means to supply outputs indicative of keyboard-selected characters to said buffer storage means.

8. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of the characters scanned, buffer storage means connected to said recognition circuit means for storing the outputs of said character recognition means for subsequent delivery to an output device, said character recognition circuit means having reject signal means operable to provide a signal upon the scanning of a questionable character, the combination with the foregoing of visual character inspection means governed by said reject signal means, including means for halting the axial movement of said drum, switching means to stop delivery of the output of said recognition circuit means to said buffer storage means, means including a recurrently operated strobe lamp for recurrently illuminating the questionable character to effectively stop the motion of the document for visual inspection, a manually operated character keyboard, means governed by said switching means to supply outputs indicative of keyboard-selected characters to said buffer storage means, and reset means effective to restore said switching means to the condition for deliverying outputs from said recognition circuit means to said buffer storage means.

9. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of characters scanned, said character recognition circuit means having reject signal means operable to provide a signal upon the scanning of a questionable character, the combination with the foregoing of visual character inspection means governed by said reject signal means including means for halting the axial motion of the document drum, a recurrently operated strobe lamp for recurrently illuminating the questionable character to effectively stop the rotation of the drum so that the questionable character may be visually examined, a magnetic recording member movable in synchronism with said document transport drum, means governed by said reject signal means for recording a signal pulse on said recording member, and signal responsive means responsive to said recorded pulse for governing said strobe lamp.

10. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of the characters scanned, buffer storage means connected to said recognition circuit means for storing the outputs of said character recognition means for subsequent delivery to an output device, said character recognition circuit means having reject signal means operable to provide a signal upon the scanning of a questionable character, the combination with the foregoing of visual character inspection means governed by said reject signal means, including means for halting the axial movement of said drum, switching means to stop delivery of the output of said recognition circuit means to said buffer storage means, and means including a recurrently operated strobe lamp for recurrently illuminating the questionable character to effectively stop the rotation of the drum so that the questionable character may be visually examined, said last named means comprising a magnetic recording member movable in synchronism with said document transport drum, means governed by said reject signal means for recording a signal pulse on said recording member, and means responsive to signals recorded on said recording member for recurrently energizing said strobe lamp.

11. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of the characters scanned, buffer storage means connected to said recognition circuit means for storing the outputs of said character recognition means for subsequent delivery to an output device, said character recognition circuit means having reject signal means operable to provide a signal upon the scanning of a questionable character, the combination with the foregoing of visual character inspection means governed by said reject signal means, including means for halting the axial movement of said drum, switching means to stop delivery of the output of said recognition circuit means to said buffer storage means, a manually operated character keyboard, and means governed by said switching means to supply outputs indicative of keyboard-selected characters to said buffer storage means, means including a recurrently operated strobe lamp for recurrently illuminating the questionable character to effectively stop the motion of the document for visual inspection, said last named means comprising a magnetic recording member movable in synchronism with said document transport drum, means governed by said reject signal means for recording a signal pulse on said recording member, and means responsive to signals recorded on said recording member for recurrently energizing said strobe lamp.

12. In a character recognition system including a document transport drum for selectively recurrently presenting a document to a scanning station for scanning said documents on a character-by-character, line-by-line basis, by progressive rotation and axial motion of said drum, scanning means at the scanning station for scanning characters, recognition circuit means connected to said scanning means for providing outputs indicative of the characters scanned, buffer storage means connected to said recognition circuit means for storing the outputs of said character recognition means for subsequent delivery to an output device, said character recognition circuit means having reject signal means operable to provide a signal upon the scanning of a questionable character, the combination with the foregoing of visual character inspection means governed by said reject signal means, including means for halting the axial movement of said drum, switching means to stop delivery of the output of said recognition circuit means to said buffer storage means, illuminating means including a recurrently operated strobe lamp for recurrently illuminating the questionable character to effectively stop the motion of the document for visual inspection, a manually operated character keyboard, means governed by said switching means to supply outputs indicative of keyboard-selected characters to said buffer storage means, reset means effective to restore said switching means to the condition for delivering outputs from said recognition circuit means to said buffer storage means, means for governing said illuminating means including means for recording a signal pulse on a magnetizable surface of said drum in response to a reject signal, and means responsive to said recorded pulse for recurrently energizing said lamp, and means governed by said reset means for erasing said recorded pulse.

No references cited.